United States Patent [19]

Pachla et al.

[11] Patent Number: 5,063,997

[45] Date of Patent: Nov. 12, 1991

[54] METHOD OF PREVENTING PRECIPITATION OF IRON COMPOUNDS DURING ACID TREATMENT OF WELLS

[75] Inventors: Sylvia K. Pachla; Robert S. Taylor; John R. Delorey, all of Calgary, Canada

[73] Assignee: Nowsco Well Service Ltd., Alberta, Canada

[21] Appl. No.: 461,119

[22] Filed: Jan. 4, 1990
(Under 37 CFR 1.47)

[30] Foreign Application Priority Data

Jan. 4, 1989 [CA] Canada ................................. 587477

[51] Int. Cl.$^5$ .............................................. E21B 43/27
[52] U.S. Cl. .................................... 166/279; 166/300; 166/304; 166/307; 252/8.553
[58] Field of Search ............... 166/270, 271, 300, 304, 166/307; 252/8.552, 8.553

[56] References Cited

U.S. PATENT DOCUMENTS

| | | | |
|---|---|---|---|
| 3,021,279 | 2/1962 | Scanley | 252/8.55 |
| 3,773,465 | 11/1973 | Keeney et al. | 252/389.53 X |
| 3,816,322 | 6/1974 | Griffin et al. | 252/8.553 X |
| 3,865,435 | 2/1975 | Sareen et al. | 252/8.551 X |
| 4,096,914 | 6/1978 | McLaughlin et al. | 166/307 |
| 4,137,972 | 2/1979 | McLaughlin et al. | 166/307 |
| 4,679,631 | 7/1987 | Dill et al. | 166/307 |
| 4,683,954 | 8/1987 | Walker et al. | 166/307 |
| 4,752,404 | 6/1988 | Burns et al. | 252/8.553 |
| 4,823,874 | 4/1989 | Ford | 252/8.553 X |
| 4,871,024 | 10/1989 | Cizek | 166/307 |

FOREIGN PATENT DOCUMENTS

| | | |
|---|---|---|
| 402677 | 2/1942 | Canada . |
| 416682 | 11/1943 | Canada . |
| 1027889 | 3/1978 | Canada . |
| 1088726 | 11/1980 | Canada . |
| 1131899 | 9/1982 | Canada . |

OTHER PUBLICATIONS

Paper No. 85-36-38, "Recent Studies Into Iron/Surfactant/Sludge Interactions in Acidizing", by J. R. Delorey, R. S. Taylor, Petroleum Society of Canadian Institute of Mining, Edmonton, Jun. 1985.
"Iron/Surfactant/Crude Interactions—New Considerations in Acidizing", by John Delorey, Robert Taylor, 3rd Brazilian Congress of Petroleum, Oct. 5-10, 1986.

*Primary Examiner*—George A. Suchfield
*Attorney, Agent, or Firm*—Oliff & Berridge

[57] ABSTRACT

The invention discloses a process for reducing sludging during acid treatment of an oil well by adding phosphinic acid or a soluble salt thereof and a source of cupric or cuprous ion. The addition of an iodide ion source to this combination aids its effectiveness in stronger acids.

21 Claims, No Drawings

METHOD OF PREVENTING PRECIPITATION OF IRON COMPOUNDS DURING ACID TREATMENT OF WELLS

FIELD OF INVENTION

The invention relates to acidizing an oil or gas reservoir. In particular it provides a method or composition for minimizing the precipitation and other complications due to iron compounds which normally occurs if precautions are not taken.

BACKGROUND OF THE INVENTION

It is well known that during the process of acid treating a subterranean formation, contamination of the treating acid by dissolved iron or by iron compounds is inevitable. An article appearing in Sept. 3, 1984 issue of the Oil & Gas Journal (Page 87-88) indicates the level of iron typical of various sources. It is concluded that the principal source is the mill scale and rust on the steel tubulars that form the conduit from the surface to the formation. It concludes that in the absence of an acid prewash, levels of 9,000 to 100,000 mg/L iron can occur. When an acid washing treatment is carried out prior to the formation treatment, 1,000 to 2,000 mg/L of dissolved iron should be the level of iron entering the formation. A more recent paper (#13) presented Oct. 6, 1987 to the Petroleum Society of Canadian Institute of Mining in Regina, Saskatchewan indicates that a small volume acid wash carried out just prior to the acid treatment can still result in iron levels of 500 to 7,000 mg/L in the acid contacting the formation. It should also be noted that low reservoir pressure, acid disposal problems, or the presence of a permanent packer around the tubing may make it impossible to conduct an acid wash prior to the acid treatment. It is therefore important to take precautions to minimize the affects of ferric and ferrous iron contamination in the treatment acid.

U.S. Pat. No. 1,137,290 reviews a partial list of iron problems and their control. From the background provided, the most widely recognized problem is the precipitation of ferric hydroxide as the acid spends on acid soluble scale or formation components. Ferrous hydroxide being much more soluble does not normally constitute a problem. The use of sequestering agents such as citric acid, ethylene diamine tetra-acetic acid (EDTA) or nitrilo triacetic acid (NTA) were described as the most common agents for controlling the precipitation, although their effectiveness at temperatures above 125°-150° F. is poor. Another problem referred to is the precipitation of insoluble iron asphaltene compounds. U.S. Pat. No. 4,096,914 discloses the reaction of the ferric iron in hydrochloric acid strengths of 0.1 to 2.0 molar (0.4 to 7.0 wt %) with toluene solutions of Ventura asphaltic crude oil. Sequestering of the ferric acid in acid solution using salicylic acid was proposed as a method of control. The highest level of ferric iron tested was 3,400 mg/L. The use of monosodium phosphinite was disclosed and shown to reduce the sludge from 250 mg down to 18 mg. Although this is impressive, the solutions were aged for 20 hours at 70° C. prior to testing. This is not representative of most acid treatment conditions.

In U.S. Pat. No. 4,137,972 the use of sulfosalicylic acid is proposed as an improvement over salicylic acid proposed although only comparative complex ion formation data was given and only on solutions with pH values 3-10.

Referring again to U.S. Pat. No. 1,137,290, it is claimed that ascorbic acid, erythorbic acid and/or their salts have utility in minimizing both the ferric hydroxide problem and the iron asphaltene problem. No data however was given to show their effectiveness in preventing iron asphaltene precipitates.

A more exhaustive description of the problems caused by iron contamination in acidizing is contained in a paper (#85-36-38) presented to the Petroleum Society of Canadian Institute of Mining in Edmonton, June 1985, and also slightly modified in a paper (#TT-107) presented to the Third Petroleum Congress of Brazil, October 1986, in Rio de Janeiro. In those papers data is presented to show that, in addition to ferric hydroxide precipitation on spending and iron asphaltene precipitation (iron induced sludging), iron contamination (notably ferric) can also adversely react with other acid additives. The reaction appears to involve the formation of complexes between the iron and oxygen-containing organic compounds such as ethoxylated surfactants. The result of this reaction is that a normally dispersible blend of acid additives can, when iron contamination is present, separate from solution as glue like droplets containing a high dissolved iron content. Both the iron asphaltene precipitation and the iron/surfactant reactions were shown to be much more prevalent in 28% acid compared to 15% acid and much more pronounced for ferric iron compared to ferrous iron. In the absence of a totally effective chemical solution to the iron problems, several modifications to the field execution of acid treatments were recommended to minimize the level of iron contamination.

Two additional problems were reported in the April 1985 issue of The Journal of Petroleum Technology pages 691 to 695. In the case of sour wells it is apparent that any ferric iron present can oxidize sulfides to insoluble elemental sulfur deposits. Also, ferrous iron can form insoluble ferrous sulfides as the acid spends. This can be quite plugging and the use of chelating agents is required to minimize this latter effect. An effective reducing system is recommended to minimize all other iron problems.

The most recent art noted is that of U.S. Pat. No. 4,679,631, wherein dihydroxy maleic acid or its salts combined with gluconodeltalactone or boric acid or boric salts is found to be a reducing agent for ferric iron in fracturing fluids. The same composition is described as a complexing agent for ferric iron in acidizing fluids. No reference to the effectiveness of the composition in preventing the iron asphaltene precipitation in acid was made but it is logical to expect it to be negligible.

It is apparent then, that from current art, the best known methods of preventing ferric iron problems including iron asphaltene precipitation is through the use of erythorbates (ascorbic acid, erythorbic acid and their salts), or alternatively the use of sulfosalicylic acid.

Numerous tests by the inventors with Canadian crude have shown that while erythorbates are quite effective in preventing sludge in 10% hydrochloric acid and low concentrations of ferric iron their effectiveness drops off rapidly as the acid strength increases to 15%. As a result, excessive amounts of erythorbates must be used to control iron asphaltene sludge in 15% hydrochloric acid. In addition, erythorbates are unstable in hydrochloric acid and degrade fairly rapidly to tarry solids. The rate of degradation increases dramatically as the temperature of the acid is raised. This is a particularly serious problem when a staged acid treatment is being carried out. In this case, packers must be set and released across sections of the zone to be stimulated and generally small volumes of acid are injected during each stage. The acid in those cases can remain at reservoir temperature for one or more hours. During this time degradation of the erythorbates would most certainly occur, thereby limiting their use in deep well acidizing.

Sulfosalicylic acid on the other hand has been found ineffective in preventing iron asphaltene sludge in 15% hydrochloric acid with the Canadian oils tested. It is desirable in most instances to use 15% hydrochloric acid or higher to provide for increased penetration of live acid into the formation while minimizing the amount of spent acid that has to be produced back (unloaded) following the treatment.

There is therefore a need for more acid stable and effective agents for controlling the iron induced sludging of oils during acidizing.

SUMMARY OF INVENTION

The invention comprises an improved method of controlling iron precipitation and additive incompatibilities during conditions involved in the acid treatments of wells. It involves the use of a select catalytic agent along with a select reducing agent to obtain the reduction of ferric iron to ferrous iron required to prevent the formation of iron precipitation products during well acid treatments. The use of catalytic agents such as transition metal ions, iodide ions, etc. as a means of speeding up thermodynamically favourable but kinetically slow electrochemical oxidation and reduction reactions is practiced in many analytical methods and chemical processes. Its use as a means of obtaining the maximum reduction of ferric iron from a reducing agent during acid well treatments however, is novel and provides an extremely effective means of solving iron precipitation problems.

Thus, the present invention comprises a process of reducing sludge formation during the acid treatment of a subterranean formation with a treatment acid, comprising adding to the acid solution used for such treatment a) at least one of (i) phosphinic acid and (ii) a salt thereof which is soluble in the acid used for treating the formation and which does not form a precipitate during treatment, and b) a catalytic amount of cupric or cuprous ion in a form soluble in the treatment acid, and wherein the cupric or cuprous ion is added as a salt which does not form a sludge or precipitate with the oil in the subterranean formation.

DESCRIPTION OF THE PREFERRED EMBODIMENTS

Many electrochemical reducing agents and catalysts or promoters exist, however, only a select few will be suitable for the purposes of this invention. Many reducing agents such as stannous ion, hydrazine and related compounds, etc. cause asphaltic sludge even in the absence of iron. Others such as erythorbates, and most organic compounds, are degraded to varying degrees in strong acid forming carbonaceous residues and are therefore ineffective in controlling the gradual contamination by iron. Still others such as thiosulfates not only degrade but in so doing form elemental sulphur precipitates and are therefore undesirable. The one family of reducing agents which has been found particularly suitable for this invention consists of phosphinic acid (hypophosphorous acid) and/or salts of phosphinic acid.

Similarly the choice of catalytic agent is critical. Many known catalytic agents such as cobalt salts, ferrous iron, iodide salts etc. were found to be ineffective in catalyzing the action of the reducing agents when tested in strong acid. However it has been found that for acids or blends of acids with strengths equivalent to approximately 15% hydrochloric acid or less cuprous and cupric ions are effective catalysts. These are generally provided by cupric or cuprous salts having some solubility in the particular acid used although some organo-metallic compounds may also be used. Sulfate salts of copper should be avoided because of calcium sulfate precipitation on spending. Any other salt which is known to form a sludge or precipitate with the crude oil used should also be avoided. Other than this, the choice of cuprous or cupric salt is governed by cost and availability. The preferred salts are CuCl and $CuCl_2$, because these are inexpensive and easily available, $CuNO_3$ is also usable in some cases. CuO is usable if it is appreciably soluble in the particular treatment acid being used.

For acids or blends of acids with strengths equivalent to approximately 15% hydrochloric acid or greater, the cuprous or cupric salts are of some utility, but it is advantageous to include a co-catalyst comprising iodide ions. This greatly improves the effect of the cuprous or cupric salt. Thus, it is more advisable to add iodide ions for situations of higher acid concentration. The source of these iodide ions can be any iodide compound or complex (including organic iodides) which does not itself lead to sludge formation and which is capable of liberating iodide ions in the oil. In the preferred embodiment, potassium iodide is used as the source of iodide ions.

The use of cuprous and/or cupric salts combined with phosphinic acid and/or its salts and the use of iodide salts for high acid concentration provide effective sludge control. Further, when phosphinate, cuprous, or iodide salts are used, they may also improve the function of corrosion inhibitors, as known in the art, thus giving a further benefit.

The concentrations of cupric or cuprous ion can vary greatly. Even very small concentrations relative to the phosphinic acid provide some beneficial effect. Small concentrations are particularly effective when the well is hotter than about 100° C. In such cases, concentrations of cupric or cuprous ions as low as 0.5% of the amount of phosphinic acid (or its equivalent in a phosphinic salt) present can be used. However, where the well is cooler, better results are obtained by using larger concentrations of cupric or cuprous ions. Generally, cupric or cuprous ion should be present in a concentration of from 5% to 40% of the phosphinic acid present. Larger amounts of cupric or cuprous ion can be present. However, in each case the particular crude oil with which the invention is to be used should be tested, to ensure that no sludging results from the presence of the amount of cupric or cuprous salt which it is desired to add.

As with the cupric or cuprous salt, there is no lower limit on the amount of phosphinic acid which may be used in the treatment acid. Even small or trace amounts will have some beneficial effect on sludging. The effect will increase as the concentration of phosphinic acid is increased. After a certain concentration is reached further increases will yield diminishing or no improvement. This concentration will vary with the particular crude oil, and can easily be determined by carrying out an iron sludge test as set out in the examples section of this disclosure. Generally it is preferred to use from about 2 Kg. to about 50 Kg. of phosphinic acid per cubic meter of well treatment fluid, although higher amounts of up to 100 Kg., can be used where there are severe sludging problems.

If desired, the phosphinic acid can be replaced by a soluble phosphinic salt, such as sodium phosphinate. In this case, care must be taken that the metal ion of the salt does not give rise to an insoluble precipitate with other compounds present in the acid or components of the crude oil. Visual inspection of the acid and a sludging test as set out in the examples section of this disclosure should be carried out to ensure that this is not the case.

In the case of acids or blends of acids with strengths equivalent to approximately 15% hydrochloric acid or greater, the use of a source of iodide ions greatly improves the speed and degree of reduction of ferric iron and sludge prevention. The amount of iodide ion required varies with the temperature, acid strength and the nature of the crude oil but is in the same range as that of the cuprous/cupric ion source.

The invention is useful with respect to preventing sludge formation in wells treated with many common well treating acids, including:

1-34% hydrochloric acid
acetic acid
formic acid
hydrofluoric acid
fluoboric acid
sulfamic acid
phosphoric acid
and mixtures of the above In applying the invention to different acid types, obvious solubility problems have to be remembered. The sodium salt of phosphonic acid should not be used in 28% hydrochloric acid due to precipitation of sodium chloride whereas the calcium phosphonite or phosphinic acid would be quite acceptable. Similarly the ammonium salt or the acid form should be used for hydrofluoric acid solutions to minimize the formation of insoluble fluosilicates when spending on silicates.

Further, the treatment acids may be modified by addition of agents known to practitioners of the art to provide galled acid, emulsified acid, gasified acid, foamed acid and alcoholic acid. These acids can be used in a variety of acidizing techniques. These techniques are well described in the literature on Oilfield Acidizing.

The field application of the invention is rather straight forward. In the case of the cuprous chloride and sodium phosphonite example, the sodium phosphinite is mixed along with the other required acid additives into the dilution water for the concentrated hydrochloric acid. These additives typically include corrosion inhibitors, non-emulsifying and anti-sludging agents. The concentrated hydrochloric acid is then added to arrive at a hydrochloric acid solution of the desired strength. The cuprous chloride is then added and once dissolved, the acid is ready to acid treat the well. If potassium iodide is used it can be added along with the phosphinic acid. While this method of mixing has been found suitable, variations of the mixing procedure can be made without detracting from the utility of the invention.

EXAMPLES

The utility and effectiveness of the invention is demonstrated by the quantitative iron asphaltene precipitation data shown in Tables 1 and 2.

The data in Table 1 provides a comparison between the prior art and the present invention when tested with a typical iron sensitive Canadian crude. In addition to demonstrating the improved effectiveness in providing iron-asphaltene precipitation, the results also show the effect of the degradation of the erythorbates even in the absence of iron.

Table 2 provides other examples of the invention with crude oils from a variety of Canadian formations and one particularly iron sensitive crude from Brazil. The choice of the other additives added to the acid very much depends upon the nature of the oil being tested and require compatibility testing in order to arrive at the optimum concentration of additives. These additives include corrosion inhibitor, nonemulsifier and antisludging additives whose composition and availability is known by people skilled in the art of acid well treatments.

No data on ferric hydroxide precipitation is given because spending the acids of the present invention on marble chips shows no traces of such precipitation nor any precipitation of calcium compounds. The iron-asphaltene precipitation test in strong acid represents a demanding test of the ability of the invention to control ferric iron.

The results therefore clearly demonstrate the improvement of the present invention over existing art.

| IRON SLUDGE RESULTS WITH BEAVERHILL LAKE FORMATION CRUDE (SOUTH SWAN HILLS FIELD) AND *ACID BLEND 1 | | | | | |
|---|---|---|---|---|---|
| | Amount of Sludge (mg) | | | | |
| | No Fe | 0.1 g/L Fe + 3 | 1.0 g/L Fe + 3 | 5.0 g/L Fe + 3 | 10.0 g/L Fe + 3 |
| No I.C.A. | 12.8 | 74.3 | 320.9 | — | — |
| 3% Sulfosalicylic Acid | 11.9 | 19.6 | 243.9 | — | — |
| 3% Sodium Erythorbate | 18.8 | 21.2 | 27.0 | 71.4 | — |
| 3% Sodium Phosphinite** | 12.1 | 16.0 | 61.4 | 149.5 | — |
| 3% Sulfosalicylic acid + 3,000 mg/L Cu+ | 13.6 | 15.0 | 64.0 | — | — |
| 3% Sodium erythorbate + 3,000 mg/L Cu+ | 20.1 | 20.8 | 22.2 | 58.3 | — |
| 3% Sodium erythorbate + 3,000 mg/L Fe + 2 | 18.6 | 20.2 | 27.1 | 58.4 | — |
| 3% Sodium phosphinite** + 3,000 mg/L Cu+ | 12.3 | 12.0 | 12.8 | 12.3 | 14.3 |

*Acid Blend 1 - See Iron Sludge Test Procedure
**$NaH_2PO_2 \cdot H_2O$
I.C.A. - Iron Control Additive as per Iron Sludge Test Procedure.

TABLE II

IRON SLUDGE RESULTS WITH VARIOUS CRUDES

| Formation | L.S.D. | Amount of Sludge (mg) | | | | |
|---|---|---|---|---|---|---|
| | | No Fe3+ I.C.A. | 1 g/L Fe3+ No I.C.A. | 1 g/L Fe + 3 I.C.A. | 5 g/L Fe + 3 I.C.A. | 20 g/L Fe3+ I.C.A. |
| *U. Shaunavon | 16-09-05-20-W3 | 16 | 478 | 11 | 16 | 10 |
| *Fish Scale | 06-30-10-17-W4 | 9 | 382 | 11 | 8 | 10 |
| *Glauconite | 05-12-53-17-W4 | 18 | 490 | 17 | 14 | 17 |
| | 07-02-39-23-W4 | 10 | 413 | 11 | 9 | 10 |
| *Cardium | 06-24-39-23-W4 | 15 | 394 | 13 | 14 | 14 |
| | 10-23-35-07-W5 | 31 | 442 | 32 | 28 | 30 |
| | 03-32-34-08-W5 | 25 | 418 | 22 | 26 | 25 |
| *Basal Quartz | 07-26-16-24-W4 | 393 | additives 11 | 11 | | |
| *Nisku | 16-31-39-25-W4 | 50 | 485 | 46 | 49 | 46 |
| *Belly River 23 | | 529 | 26 | 20 | 22 | |
| | 11-07-19-02-W5 | 42 | 591 | 40 | 38 | 40 |
| Rundle *Nisku "B" | 12-09-52-08-W5 | 34 | 612 | 30 | 29 | |
| *Pekisko | 07-10-63-10-W5 | 44 | 432 | 40 | 39 | 42 |
| *Keg River 21 | 04-31-114-05-W6 | 19 | | | | |
| | 23 | 19 | | | | |
| | 02-10-117-05-W6 | 38 | 399 | filter 31 | | |
| *Charlie Lake | 06-22-84-08-W6 | 47 | 512 | 41 | 49 | 41 |
| Grande | IPM-5 Brazil | 27 | 3410 | 23 | 26 | 21 |
| **Midale | 05-20-04-12-W2 | 13 | 321 | 10 | 12 | 11 |
| **Viking | 07-19-31-21-W3 | 33 | 404 | 34 | 30 | 29 |
| **D-3 | 02-16-66-15-W5 | 19 | 464 | 18 | 20 | 18 |
| | 16-16-63-25-W5 | 30 | 482 | 26 | 20 | 28 |
| **Judy Creek BHL | 08-23-63-11-W5 | 49 | 617 | 47 | 51 | 49 |
| **Virginia Hills, BHL | 08-26-64-13-W5 | 53 | 681 | 50 | 52 | 54 |
| **Swan Hills BHL | 08-29-66-10-W5 | 47 | 583 | 46 | 49 | 50 |
| **Meekwap BHL | 07-17-66-15-W5 | 52 | 622 | 53 | 50 | 48 |
| **Boundary Lake | 04-28-77-11-W6 | 28 | 493 | 31 | 25 | 30 |
| **Frobisher | 08-16-04-01-W2 | 19 | 384 | 22 | 16 | 19 |

*Acid Blend 2 - See Iron Sludge Test Procedure
**Acid Blend 3 - See Iron Sludge Test Procedure
I.C.A. - Iron Control Additive as per Iron Sludge Test Procedure.
BHL - Beaverhill Lake Formation.

IRON SLUDGE TEST PROCEDURE

Mix additives in 60 mLs of acid in a 250 mL glass bottle.
Add iron solution and mix.
After 2-3 minutes add 50 mL of crude oil.
Shake vigorously for two minutes.
Place in water bath at 85° C. for 30 minutes.
Vacuum filter on preweighed $\beta$ micron filter paper.
De-oil residue with diesel fuel followed by pentane.
Vacuum oven dry and then reweigh.

Note: Even a non-sludging oil will give a minimum residue of approximately 10 mg due to traces of unwashed non-volatile liquids and adsorption or staining of filter media.

Acid Blend 1
15 wt % Hydrochloric Acid
15 L/m$^3$ *Nowferr 3 (corrosion inhibitor)
8 L/m$^3$ *Nowferr 5 (anti-sludging agent/non-emulsifier)

Acid Blend 2
16 wt % Hydrochloric Acid + ? I /m$^3$ *AI-250 (corrosion inhibitor)
5 L/m$^3$ *AI-170 (corrosion inhibitor)
15 L/m$^3$ *DL-26 (anti-sludging agent/non-emulsifier)

Acid Blend 3
15 wt % Hydrochloric Acid + 20 L/m$^3$ *Nowferr 4 (corrosion inhibitor/non-emulsifier/anti-sludge additive)

| Iron Control Additives (I.C.A.): for | | 1 g/L Fe + 3 | 5 g/L Fe + 3 | 20 g/L Fe + 3 |
|---|---|---|---|---|
| | CuCl | 1.0 kg/m$^3$ | 3.5 kg/m$^3$ | 6.0 kg/m$^3$ |
| | NaH$_2$PO$_2$H$_2$O | 6.0 kg/m$^3$ | 21.0 kg/m$^3$ | 36.0 kg/m$^3$ |

*Commercially available Nowsco Additives.

It will be understood that the foregoing disclosure is intended to exemplify the invention, and that modifications or other embodiments will be readily evident to one skilled in the art. It is therefore intended that the disclosure should be construed in an illustrative and non-limitative manner, and that the scope of the invention shall be as set out in the attached claims.

The embodiments of the invention in which an exclusive property of privilege is claimed are defined as follows:

1. A process of reducing sludge formation during the acid treatment of a subterranean formation with a treatment acid, comprising adding to the acid solution used for such treatment
    a) at least one of (i) phosphinic acid and (ii) a salt thereof which is soluble in said acid used for treating said formation and which does not form a precipitate during treatment, and
    b) a catalytic amount of a source of cupric or cuprous ion in a form soluble in said treatment acid, and wherein said cupric or cuprous ion is added as a salt which does not form a sludge or precipitate with the oil in said subterranean formation.

2. The process as defined in claim 1 wherein the source of the cupric or cuprous ion is $CuCl_2$, for cupric ion, or CuCl, for cuprous ion.

3. A process as defined in claim 2, wherein the cuprous or cupric ion is present in an amount of from 0.5% to 40%, by weight, of the total amount of phosphinic acid and phosphinic acid equivalent of any phosphinic acid salt present and, said phosphinic acid and/or phosphinic acid equivalent of such salt is present in an amount of between 2 Kg. and 100 Kg. per cubic meter of well treatment solution.

4. The process as defined in claim 3, wherein the treatment acid is selected from the group consisting of 1-34% hydrochloric acid, acetic acid, formic acid, hydrofluoric acid, fluoboric acid, sulfamic acid, phosphoric acid, and mixtures of same.

5. A process as defined in claim 4 comprising, adding to said treatment acid a co-catalytic amount of a source of iodide ions, wherein said source of iodide ion is soluble in said treatment acid and does not form a sludge or precipitate with the oil in said subterranean formation.

6. A process as defined in claim 5, wherein the iodide ion is present in an amount of from 0.5% to 40%, by weight, of the total amount of phosphinic acid and phosphinic acid equivalent of any phosphinic acid salt present and, said phosphinic acid and/or phosphinic acid equivalent of such salt is present in an amount of between 2 Kg. and 100 Kg. per cubic meter of well treatment acid solution.

7. A process as defined in claim 6 wherein the source of the iodide ion is potassium iodide.

8. A process as defined in claim 1, wherein the cuprous or cupric ion is present in an amount of from 0.5% to 40%, by weight, of the total amount of phosphinic acid and phosphinic acid equivalent of any phosphinic acid salt present and, said phosphinic acid and/or phosphinic acid equivalent of such salt is present in an amount of between 2 Kg. and 100 Kg. per cubic meter of well treatment solution.

9. A process as defined in claim 8, further including adding from 0.5% to 40%, based on the total weight of phosphinic acid and phosphinic acid equivalent of any phosphinic acid salt present, of iodide ion in a form soluble in said treatment acid, and wherein said iodide ion source does not form a sludge or precipitate with the oil in said subterranean formation.

10. The process as defined in claim 9 wherein the treatment acid is selected from the group consisting of 1-34% hydrochloric acid, acetic acid, formic acid, hydrofluoric acid, fluoboric acid, sulfamic acid, phosphoric acid, and mixtures of same.

11. A process as defined in claim 10, wherein the source of the cupric or cuprous ion is present as $CuCl_2$, for cupric ion, or as CuCl, for cuprous ion.

12. A process as defined in claim 11 wherein the source of the iodide ion is potassium iodide.

13. The process as defined in claim 1 wherein the treatment acid is selected from the group consisting of 1-34% hydrochloric acid, acetic acid, formic acid, hydrofluoric acid, fluoric acid, sulfamic acid, phosphoric acid, and mixtures of same.

14. A process as defined in claim 1 comprising, adding to said treatment acid a co-catalytic amount of a source of iodide ions, wherein said source of iodide ion is soluble in said treatment acid and does not form a sludge or precipitate with the oil in said subterranean formation.

15. A process as defined in claim 14 wherein the cuprous or cupric ion is present in an amount of from 0.5% to 40%, by weight, of the total amount of phosphinic acid and phosphinic acid equivalent of any phosphinic acid salt present and the iodide ion is present in an amount of from 0.5% to 40%, by weight, of the total amount of phosphinic acid and phosphinic acid equivalent of any phosphinic acid salt present and, said phosphinic acid and/or phosphinic acid equivalent of such salt is present in an amount of between 2 Kg. and 100 Kg. per cubic meter of well treatment acid solution.

16. A process as defined in claim 15 wherein the source of the iodide ion is potassium iodide.

17. A process as defined in claim 1, wherein the concentration of said treatment acid is equivalent to approximately 15% hydrochloric acid or greater, further including adding from 0.5% to 40%, based on the total weight of phosphinic acid and phosphinic acid equivalent of any phosphinic acid salt present, of iodide ion in a form soluble in said treatment acid, and wherein said iodide ion source does not form a sludge or precipitate with the oil in said subterranean formation.

18. The process as defined in claim 17 wherein the treatment acid is selected from the group consisting of 1-34% hydrochloric acid, acetic acid, formic acid, hydrofluoric acid, fluoboric acid, sulfamic acid, phosphoric acid, and mixtures of same.

19. A process as defined in claim 18, wherein the source of the cupric or cuprous ion is $CuCl_2$, for cupric ion, or CuCl, for cuprous ion.

20. A process as defined in claim 19 in which the cuprous or cupric ion is present in an amount of from 0.5% to 40%, by weight, of the total amount of phosphinic acid and phosphinic acid equivalent of any phosphinic acid salt present, and the phosphinic acid and/or phosphinic acid equivalent of the salt is present in an amount of between 2 Kg. and 100 Kg. per cubic meter of well treatment acid solution.

21. A process as defined in claim 20 wherein the source of the iodide ion is potassium iodide.

* * * * *

UNITED STATES PATENT AND TRADEMARK OFFICE
CERTIFICATE OF CORRECTION

PATENT NO. : 5,063,997

DATED : November 12, 1991

INVENTOR(S) : Sylvia K. PACHLA; Robert S. TAYLOR & John R. DeLOREY

It is certified that error appears in the above-identified patent and that said Letters Patent is hereby corrected as shown below:

On the title page and column 1, lines 1-3
Change item [54] from "METHOD OF PREVENTING PRECIPICATION OF IRON COMPOUNDS DURING ACID TREATMENT OF WELLS" to --ANTI-SLUDGING TREATMENT--.

Signed and Sealed this

Ninth Day of March, 1993

Attest:

STEPHEN G. KUNIN

Attesting Officer

Acting Commissioner of Patents and Trademarks